US006223095B1

(12) United States Patent
Yamazaki et al.

(10) Patent No.: US 6,223,095 B1
(45) Date of Patent: Apr. 24, 2001

(54) NUMERIC CONTROL COMMAND GENERATOR AND METHOD

(75) Inventors: Kazuo Yamazaki, 44204 Greenview Dr., El Macero, CA (US) 95618; Yasushi Fukaya, Niwa-gun (JP); Naoki Morita, Yamatokoriyama (JP); Sadayuki Matsumiya, Kawasaki (JP)

(73) Assignees: Okuma Corporation, Nagoya; Kabushiki Kaisha Mori Seiki Seisakusho, Yamatokoriyama; Mitutoyo Corporation, Kawasaki, all of (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/101,155

(22) PCT Filed: Jan. 7, 1996

(86) PCT No.: PCT/JP96/03267

§ 371 Date: Jul. 2, 1998

§ 102(e) Date: Jul. 2, 1998

(87) PCT Pub. No.: WO98/19823

PCT Pub. Date: May 14, 1998

(51) Int. Cl.$^7$ .................................................. G05B 19/42
(52) U.S. Cl. .............................................. 700/187; 700/86
(58) Field of Search ........................... 700/86, 186, 187, 700/189; 318/569, 570, 571, 572

(56) References Cited

U.S. PATENT DOCUMENTS

| 4,998,196 | * | 3/1991 | Seki et al. ............................ 364/191 |
| 5,173,648 | * | 12/1992 | Kawamura et al. ................. 318/568 |
| 5,704,238 | * | 1/1998 | Tokai .................................. 72/31.11 |
| 5,828,574 | * | 10/1998 | Robinson et al. ................... 364/474 |
| 5,930,142 | * | 7/1999 | Schleicher et al. ................. 364/474 |

* cited by examiner

*Primary Examiner*—Thomas Lee
*Assistant Examiner*—Nitin Patel
(74) *Attorney, Agent, or Firm*—Oliff & Berridge, PLC

(57) ABSTRACT

An apparatus and a method for generating orientation action commands of NC machine tools. Workpiece surfaces are grouped according to inclination of the surfaces on the basis of machining information. Optimum orientation angles are decided for each of the groups, and numerical control commands are generated on the basis of the decided orientation angle.

8 Claims, 10 Drawing Sheets

DIVIDED WORKPIECE SURFACE LATTICE POINT Z DATA

| NUMBER OF DIVIDED WORKPIECE SURFACE | (a) DIVIDED WORK-PIECE SURFACE LATTICE POINT Z DATA | (b) DIVIDED WORK-PIECE SURFACE DEGREE-OF-INCLINATION DATA | (c) DIVIDED WORKPIECE SURFACE GROUP NUMBER | (d) DIVIDED WORK-PIECE SURFACE ORIENTATION ANGLE DATA |
|---|---|---|---|---|
| 1 | $Z(X_1, Y_1)=H_{11}$<br>$Z(X_2, Y_1)=H_{12}$<br>$Z(X_2, Y_2)=H_{13}$<br>$Z(X_1, Y_2)=H_{14}$ | a1 | 1 | 01 |
| 2 | $Z(X_1, Y_2)=H_{21}$<br>$Z(X_2, Y_2)=H_{22}$<br>$Z(X_2, Y_3)=H_{23}$<br>$Z(X_1, Y_3)=H_{24}$ | a2 | 1 | 01 |
| 3 | $Z(X_1, Y_3)=H_{31}$<br>$Z(X_2, Y_3)=H_{32}$<br>$Z(X_2, Y_4)=H_{33}$<br>$Z(X_1, Y_4)=H_{34}$ | a3 | 1 | 01 |
| 4 | $Z(X_1, Y_4)=H_{31}$<br>$Z(X_2, Y_4)=H_{32}$<br>$Z(X_2, Y_5)=H_{33}$<br>$Z(X_1, Y_5)=H_{34}$ | a4 | 1 | 01 |
| 5 | $Z(X_1, Y_5)=H_{31}$<br>$Z(X_2, Y_5)=H_{32}$<br>$Z(X_2, Y_6)=H_{33}$<br>$Z(X_1, Y_6)=H_{34}$ | a5 | 1 | 01 |
| 6 | $Z(X_1, Y_6)=H_{31}$<br>$Z(X_2, Y_6)=H_{32}$<br>$Z(X_2, Y_7)=H_{33}$<br>$Z(X_1, Y_7)=H_{34}$ | a6 | 2 | 02 |
| 7 | $Z(X_1, Y_7)=H_{31}$<br>$Z(X_2, Y_7)=H_{32}$<br>$Z(X_2, Y_8)=H_{33}$<br>$Z(X_1, Y_8)=H_{34}$ | a7 | 2 | 02 |
| 8 | $Z(X_1, Y_8)=H_{31}$<br>$Z(X_2, Y_8)=H_{32}$<br>$Z(X_2, Y_9)=H_{33}$<br>$Z(X_1, Y_9)=H_{34}$ | a8 | 2 | 02 |

Fig. 3

NUMERIC CONTROL COMMAND GENERATOR AND METHOD

BACKGROUND OF THE INVENTION

1. Field of the Invention

The present invention relates to an apparatus and a method for generating commands for executing an orientation action of an NC machine tool.

In the present application, the term orientation action is defined as an action for changing the orientation of a workpiece with reference to a tool or the orientation of a tool with reference to a workpiece.

2. Description of the Prior Arts

Until now, when a free-form surface was going to be machined using a five-axis machine tool, an NC program including an interpolation command for an linerotational axis of a tool holding unit and an interpolation command for a workpiece supporting table was first prepared by an automatic programming device together with interpolation commands for linear axes, and then the free-form surface was machined by applying this NC program to an NC control device of the five-axis machine tool.

The above-mentioned automatic programming device generated the interpolation commands for the linear axes and, at the same time, calculated an optimum vector for the surface at each machining point, where the tool came in contact with the surface, on the basis of the generated interpolation commands, and then generated the interpolation commands for the linerotational axis of the tool holding unit and the linerotational axis of the workpiece supporting table so that the tool was always oriented toward the optimum vector at the machining point. Thus the automatic programming device generated an NC program including the interpolation commands for the linear axes and the interpolation commands for the angular motion axes.

As a result, when the obtained NC program has been applied to the NC control device of the five-axis machine tool, the geometrical relationship between the tool and the workpiece surface during machining will exhibit the behavior as shown in FIG. 11 and shown in exaggerated form in FIG. 12. Both of FIG. 11 and FIG. 12 show the behavior in the Y-Z plane for convenience.

SUMMARY OF THE INVENTION

In the above-mentioned method, interpolating actions for X, Y, Z linear axes and interpolating actions for angular motion axes of a tool holding unit and a workpiece supporting table should always be executed during machining. Consequently, stiffness of the machine tool is deteriorated. As a result, there are such problems that machining accuracy is lowered, and in addition, this method is not suitable for heavy cutting.

In addition, it is necessary to calculate optimum vectors at every machining point, and interpolation commands for angular motion axes should be prepared so as to cause the tool to be oriented in the direction of the optimum vector. Therefore, complicated calculation should be executed for a tremendously large number of repetitions. Consequently, it takes a long time to prepare an NC program. When it is required to shorten the calculation time, then high performance, that is, expensive automatic programming device is needed.

Objects of the present invention are to generate numerical control commands including orientation commands for angular motion axes so as to carry out heavy cutting and five-axis machining under highly rigid conditions without deteriorating machining accuracy, and in addition, to prepare the above-mentioned orientation commands without executing complicated calculations for a tremendously large number of repetitions by solving the above-mentioned problems.

The objects can be achieved by a numerical control command generating device comprising grouping means for grouping workpiece surfaces to be machined according to inclination of the surfaces on the basis of machining information, angle deciding means for deciding an orientation angle for each of the groups, and command generating means for generating numerical control commands including orientation commands based on the decided orientation angle, wherein the machining information is generated by using any of a shape to be machined, an NC program, and a decoded NC program data decoded from the NC program inside the numerical control device. The numerical control commands are generated by the NC program or the decoded NC program data decoded from the NC program inside the numerical control device, and the grouping means are prepared by comprising dividing means for dividing the workpiece surface, inclination calculating means for calculating inclination of each of the divided workpiece surfaces, and classifying means for classifying the divided workpiece surfaces on the basis of the similarity of the inclination of the divided workpiece surfaces.

In addition, the objects can be achieved in a numerical control command generating device by comprising the steps of a grouping step for grouping workpiece surfaces to be machined according to the inclination of the surfaces on the basis of machining information, an angle deciding step for deciding an orientation angle for each of the groups, and a command generating step for generating numerical control commands including orientation commands based on the decided orientation angle, wherein the grouping step is achieved by comprising the steps of a dividing step for dividing the workpiece surface, an inclination-calculating step for calculating the inclination of each of the divided workpiece surfaces, and a classifying step for classifying the divided workpiece surfaces on the basis of the similarity of the inclination of the divided workpiece surfaces.

In addition, the present invention for achieving the above-mentioned objects comprises media recording a program for making a computer execute a grouping procedure for grouping workpiece surfaces to be machined according to the inclination of the surfaces on the basis of machining information, an angle deciding procedure for deciding an orientation angle for each of the groups, and a command-generating procedure for generating numerical control commands including orientation commands based on the decided orientation angle, wherein the program for executing the grouping procedure comprises a program for executing the dividing procedure for dividing the workpiece surface, a program for executing the inclination-calculating procedure for calculating the inclination of each of the divided workpiece surfaces, and a program for executing a classifying procedure for classifying the divided workpiece surfaces on the basis of the similarity of the inclination.

BRIEF DESCRIPTION OF HE DRAWINGS

FIG. 3 is a figure showing various data concerning divided workpiece surfaces in the present invention.

DESCRIPTION OF THE PREFERRED EMBODIMENTS

The numerical control command generating device of the present invention groups the workpiece surfaces to be machined or the machining surfaces equivalent to the workpiece surfaces to be machined according to their inclination on the basis of machining information, that is, machining shapes or an NC program or decoded NC program data decoded from the NC program inside a numerical control device, and decides the orientation angles for each of the groups, and generates the numerical control commands including the orientation commands based on the decided orientation angles, that is, the NC program or the decoded NC program data decoded from the NC program inside the numerical control device.

Figure 1:
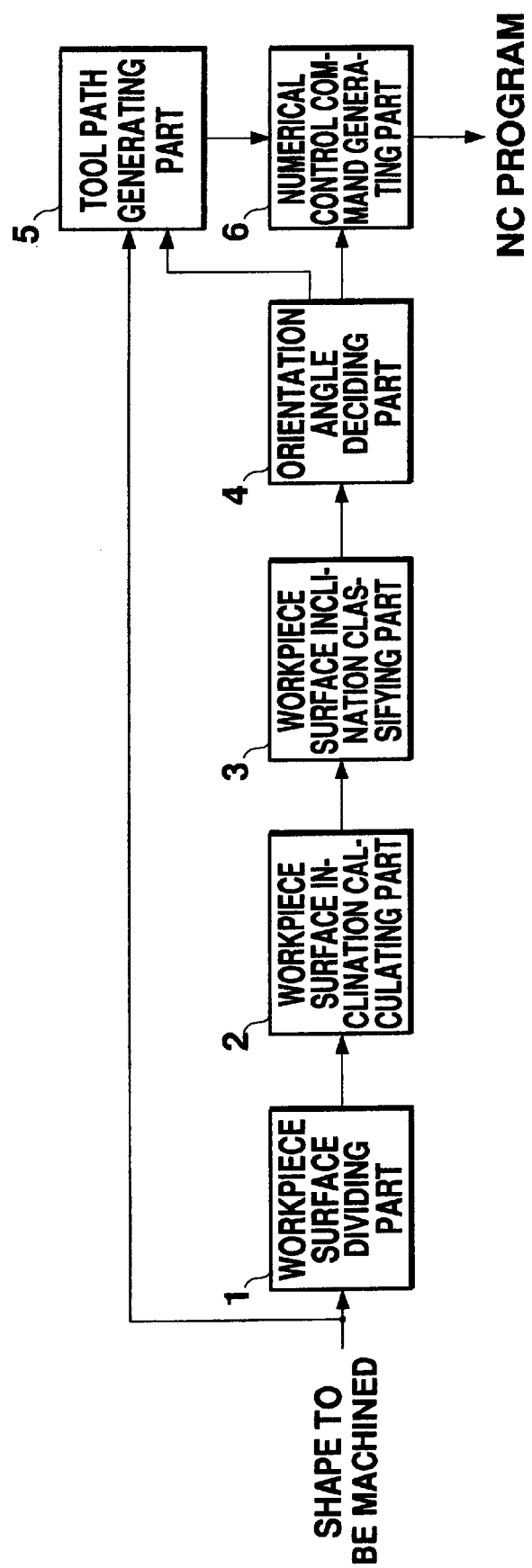
FIG. 1 is a block diagram showing a first embodiment of the present invention.

First, the embodiment to be described using the block diagram shown in FIG. 1 has such a configuration that machining shapes are input as machining information, and an NC program is output as numerical control commands including orientation commands.

Figure 2:
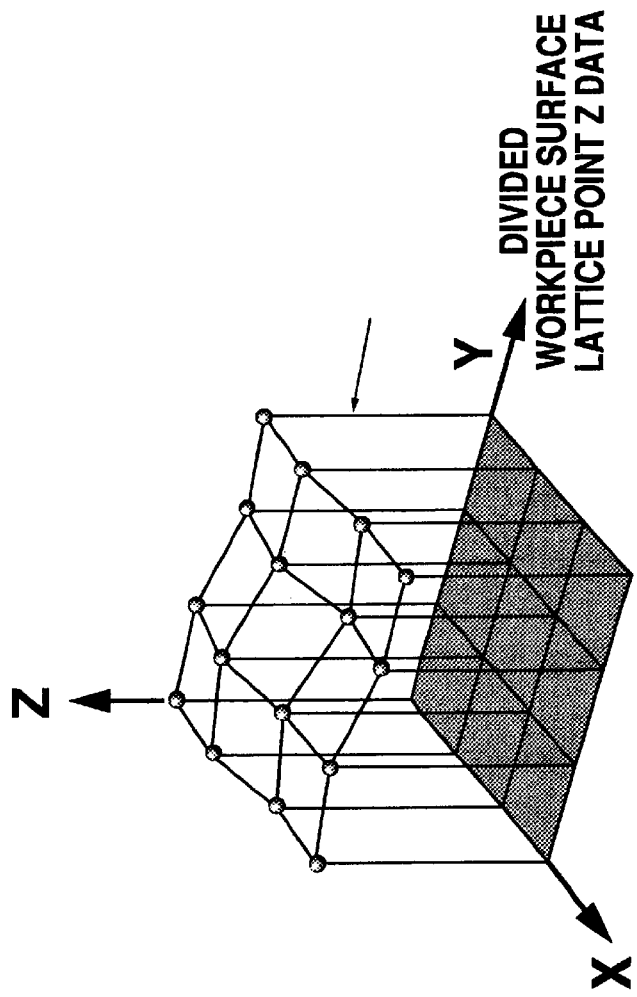
FIG. 2 is an explanatory figure showing operation of workpiece surface dividing part 1 of the present invention.

The operation of the present embodiment will now be described with reference to the block diagram shown in FIG. 1. Workpiece surface dividing part 1 for dividing a workpiece surface to be machined first divides the X-Y plane corresponding to the bottom surface of the workpiece like a lattice having a required interval as shown in FIG. 2. Next, lattice point Z data of the divided workpiece surfaces are generated on the basis of the height of the workpiece surfaces from the bottom surface of the workpiece. This data generation is carried out in such a form as shown in FIG. 3(a) for every lattice point on the workpiece surface for every divided workpiece surface.

Figure 4:
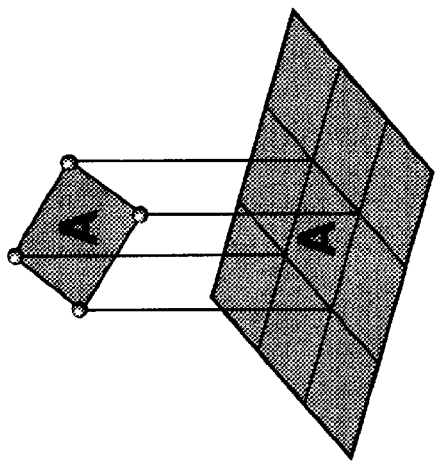
FIG. 4 is an explanatory figure showing degree of inclination of divided workpiece surfaces in the present invention.
Figure 4:
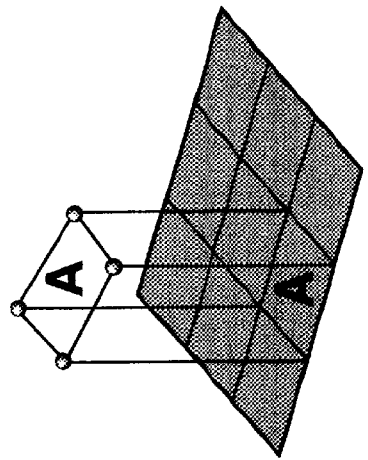

Workpiece surface inclination calculating part 2 calculates degree of inclination of the divided workpiece surfaces. That is to say, the degree of the inclination of the divided workpiece surface A' with reference to the bottom surface A of the workpiece is calculated from the four lattice point Z data of the divided workpiece surfaces as shown in FIGS. 4(a) and 4(b). This degree of inclination is generated as the divided workpiece surface degree-of-inclination data for every divided workpiece surface as shown in (b) of FIG. 3.

Workpiece surface inclination classifying part 3 groups the divided workpiece surfaces by classifying the divided workpiece surfaces into the surfaces having similar inclination. In the present embodiment, a divided workpiece surface group number is generated by giving a group number to every divided workpiece surface as shown in FIG. 3(c).

In this case, it is satisfactory to preliminarily set the range of degree-of-inclination. FIG. 3(c) shows such a case that degree-of-inclination data, a1, a2, a3, a4, and a5 are grouped in group number 1 in which degree-of-inclination, a, is given as $fa$, and degree-of-inclination data, a6, a7, and a8 are grouped in group 2 in which degree of inclination, a, is given as $fa$.

Orientation angle deciding part 4 decides only one orientation angle corresponding to degree-of-inclination for every group. For instance, because the divided workpiece surface grouped into group number 1 has such a degree-of-inclination a as $fa$, orientation angles of the angular motion axes of the tool holding unit and the workpiece supporting table can be determined so that the tool is directed in the optimum direction to the workpiece surface, which is defined as the degree-of-inclination of $(ff)/2$. The determined orientation angles can be generated as divided workpiece surface orientation angle data as shown in FIG. 3(d).

Figure 5:
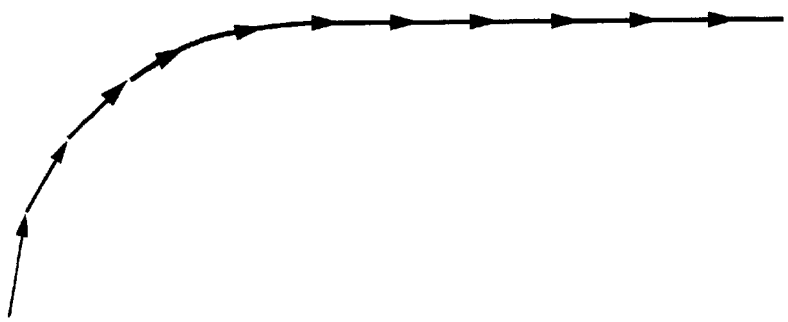
FIG. 5 is an explanatory figure showing operation of tool path generating part 5 of the present invention.
Figure 12:
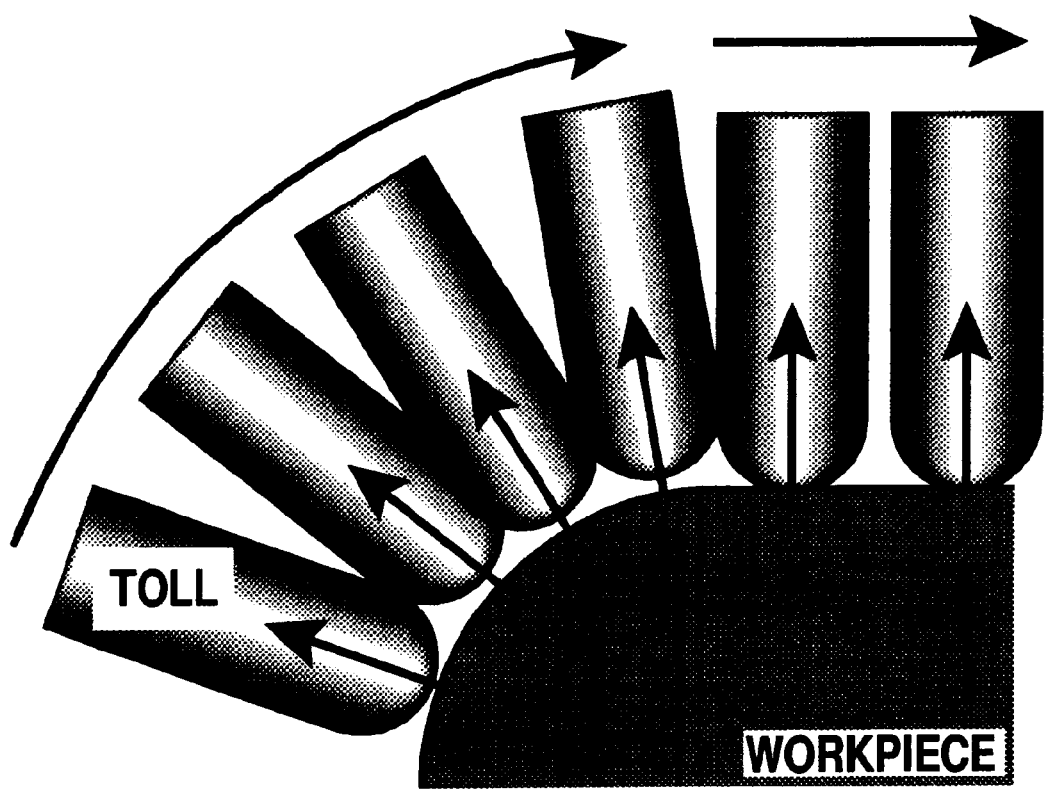
FIG. 12 is an explanatory figure showing relationship between a tool and a workpiece surface to be machined in a prior art.

Tool path generating part 5 generates a tool path, which is represented by X, Y, Z coordinates for linear axes, on the basis of the shape to be machined corresponding to every divided workpiece surface grouped in the same group number, that is, every divided workpiece surface having similar inclination. FIG. 5 shows a tool path generated by tool path generating part 5 in Y-Z plane for easy of understanding. Thin arrows and thick arrows show tool paths generated on the basis of the divided workpiece surfaces of different group numbers. These tool paths are based on FIG. 12 explained before in the Description of the Prior Art.

Numerical control command generating part 6 generates numerical control commands on the basis of the tool paths represented by the X, Y, Z coordinates generated in tool path generating part 5 and the orientation angles.

Generation of the tool paths is performed first by outputting the orientation command for the angular motion axes of the tool holding unit and the workpiece supporting table to the NC program on the basis of the orientation angle, and next by outputting the interpolation commands for X, Y, Z axes to the NC program on the basis of the tool paths represented by X, Y, Z coordinates. This output is executed for every divided workpiece surface having similar inclination.

Accordingly, the machining operation based on the NC program obtained by such processes first fixes the relative attitude of the tool and the workpiece so as to be optimum by conducting the orientation action for the workpiece surfaces having similar inclination, and then performs the machining on the basis of the interpolation commands for X, Y, Z axes. In other words, the orientation action and the machining at the orientation angle are executed successively for every workpiece surface classified by the similarity of the inclination, and the machining of the workpiece surfaces of the same orientation angle has priority over the workpiece surfaces of other orientation angles.

The above description explains the case where tool path generating part 5 generates tool paths for every divided workpiece surface of the same group number. When tool paths are to be generated regardless of group number, operations will be as follows Whenever numerical control command generating part 6 outputs interpolation commands for X, Y, Z axes to an NC program on the basis of the tool path generated by tool path generating part 5, numerical control command generating part 6 first identifies the divided workpiece surface on which the tool passes, and then recognizes the orientation angle of the identified divided workpiece surface. Next, if the recognized orientation angle is equal to the orientation angle of the preceding divided workpiece surface, the interpolation commands for X, Y, Z axes are output to the NC program as they are. If the recognized orientation angle is not equal to the orientation angle of the preceding divided workpiece surface, first, an orientation command is output, and then the interpolation commands for X, Y, Z axes are output to the NC program.

In this case, orientation actions are appropriately executed during machining as required.

In addition, because it is desirable for the orientation actions based on the orientation commands to be executed in such a state that the tool does not come in contact with the workpiece, that is, with the tool separated from the workpiece, it is obviously better for numerical control command generating part 6 to output the NC command to the NC program before outputting the orientation command so as to withdraw the tool up to the position where the orientation action is possible, and to then output the NC command to the NC program after outputting the orientation command so as to advance the tool up to the contact position before the withdrawal.

Figure 6:
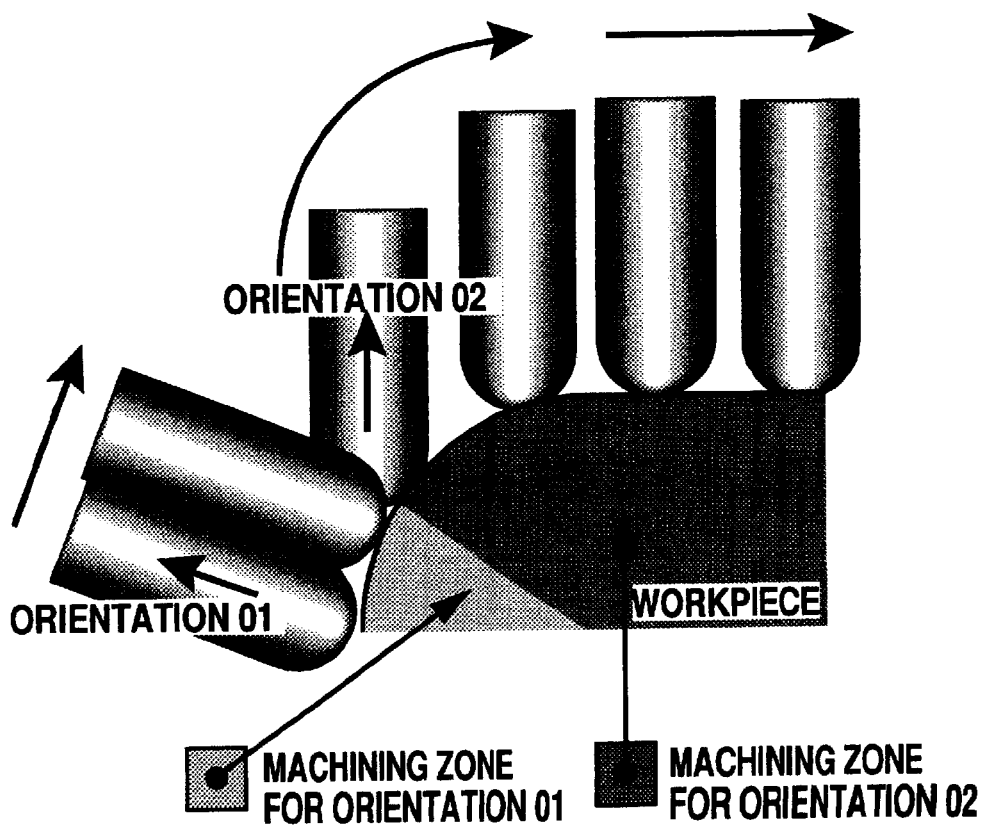
FIG. 6 is an explanatory figure showing relationship between a tool and a workkpiece surface to be machined in the present invention.
Figure 11:
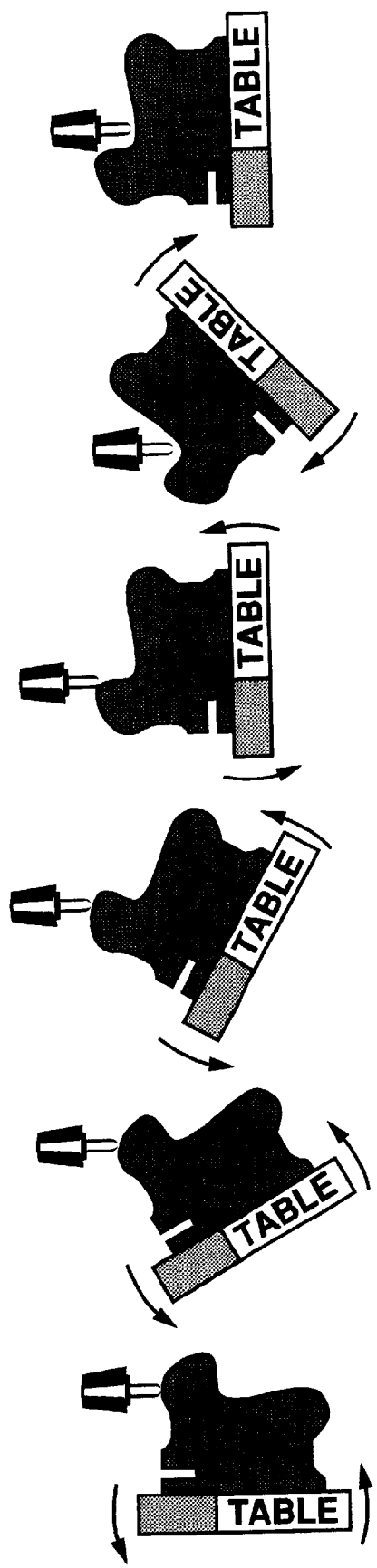
FIG. 11 is an explanatory figure showing relationship between a tool and a workpiece surface to be machined in a prior art.

An NC program, which is generated by the above-mentioned actions of workpiece surface dividing part 1, workpiece surface inclination calculating part 2, workpiece surface inclination classifying part 3, orientation angle deciding part 4, tool path generating part 5, and numerical control command generating part 6, realizes such behavior as shown in FIG. 6 when the tool path is given as shown in FIG. 5. In addition, this NC program produces such groups as shown in FIG. 7(a) and realizes such behavior as shown in FIG. 7(b) when the tool paths are based on FIG. 11 explained before in the Description of Prior Arts.

As mentioned at the beginning of the description of the present embodiment, the embodiment, in which a shape to be machined is input as machining information and an NC program is output as a numerical control command including orientation commands, was explained using a block diagram shown in FIG. 1. The embodiment explained by this block diagram may be built in an automatic programming device or a numerical control device.

Figure 8:
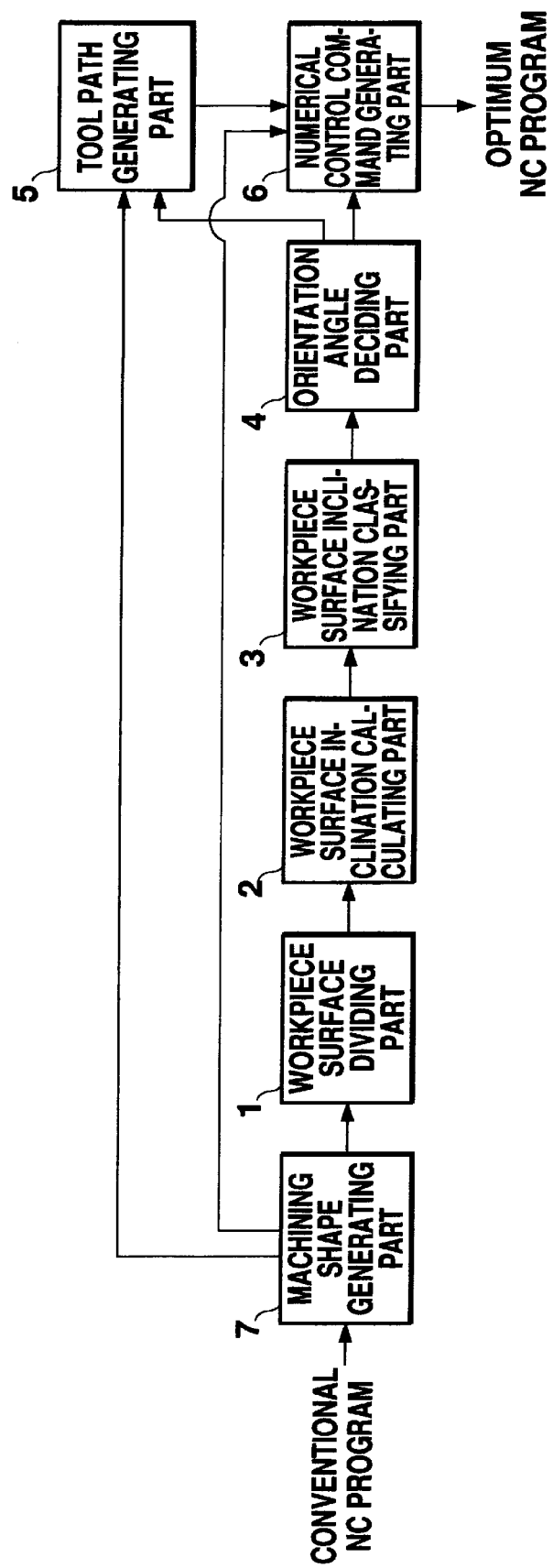
FIG. 8 is a block diagram showing a second embodiment of the present invention.

Secondly, the embodiment, in which only a conventional NC program for five-axis machining or an NC program having commands for linear axes, X, Y, Z are input, and an optimum NC program including an optimum orientation command as a numerical control command are output, will now be described using the block diagram shown in FIG. 8. The means common to FIGS. 1 and 8 are designated with the same number.

Figure 9A:
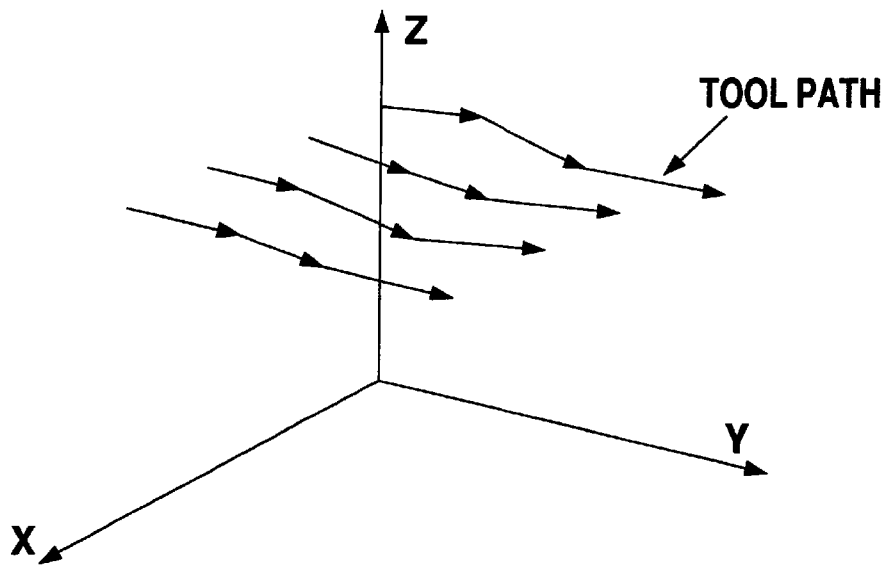
FIG. 9 is an explanatory figure showing operation of workpiece shape generating part 7 of the present invention.

As described in the block diagram shown in FIG. 1, because workpiece surface dividing part 1 generates divided workpiece surface data from the machining shape data, machining shape generating part 7 recognizes tool paths as shown in FIG. 9(a) on the basis of X, Y, Z interpolation commands on an NC program, and generates hypothetical machining shape data on the basis of the recognized tool paths, and then outputs the hypothetical machining shape data to workpiece surface dividing part 1.

Figure 9B:
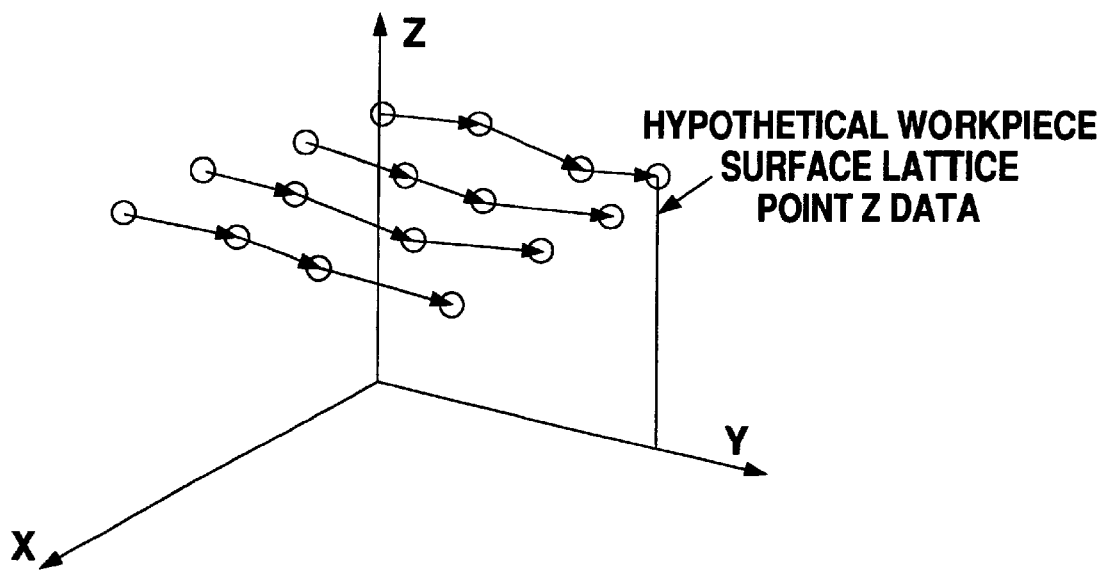

This action is performed by executing such processes that define hypothetical workpiece surface lattice points as shown in FIG. 9(b), and the heights of hypothetical workpiece surface lattice points from the X-Y plane, and a machining datum surface, are generated as hypothetical workpiece surface lattice point Z data, and then the hypothetical workpiece surface lattice point Z data are output to workpiece surface dividing part 1.

In other words, a workpiece surface having a hypothetical machining shape is recognized as an assembly of individual hypothetical divided workpiece surfaces defined by four points in a family of hypothetical workpiece surface lattice points defined on the basis of tool paths. Accordingly, workpiece surface dividing part 1 divides the X-Y plane, a machining datum surface, like a lattice having a required interval, and then generates the hypothetical workpiece surface lattice point Z data from the heights of the hypothetical divided workpiece surfaces from the machining datum X-Y plane.

Further, machining shape generating part 7 outputs the generated hypothetical machining shape to tool path generating part 5 or directly outputs X, Y, Z coordinate commands on the NC program to numerical control command generating part 6 as a tool path.

In the former case, tool path generating part 5 generates tool paths composed of X, Y, Z coordinates of linear axes from the hypothetical machining shape corresponding to every divided workpiece surface having the same group number, and numerical control command generating part 6 first outputs an orientation command to an NC program on the basis of the generated tool paths and the orientation angle, and then outputs the interpolation commands of X, Y, Z axes for executing the machining at the orientation angle to the NC program. In other words, in the present embodiment, the orientation commands and the interpolation commands for X, Y, Z axes are output for every workpiece surface having similar inclination.

In the latter case, numerical control command generating part 6 outputs the interpolation commands for X, Y, Z axes to the NC program on the basis of the tool paths output from machining shape generating part 7. In this case, whenever numerical control command generating part 6 outputs the interpolation commands for X, Y, Z axes, numerical control command generating part 6 recognizes the orientation angle of the divided workpiece surface on which the tool passes. If the recognized orientation angle is equal to the orientation angle of the preceding divided workpiece surface, then the interpolation commands for X, Y, Z axes are output to the NC program as they are. If the recognized orientation angle is not equal to the orientation angle of the preceding divided workpiece surface, then an orientation command is first output and after that, the interpolation commands for X, Y, Z axes are output to the NC program.

Figure 7:
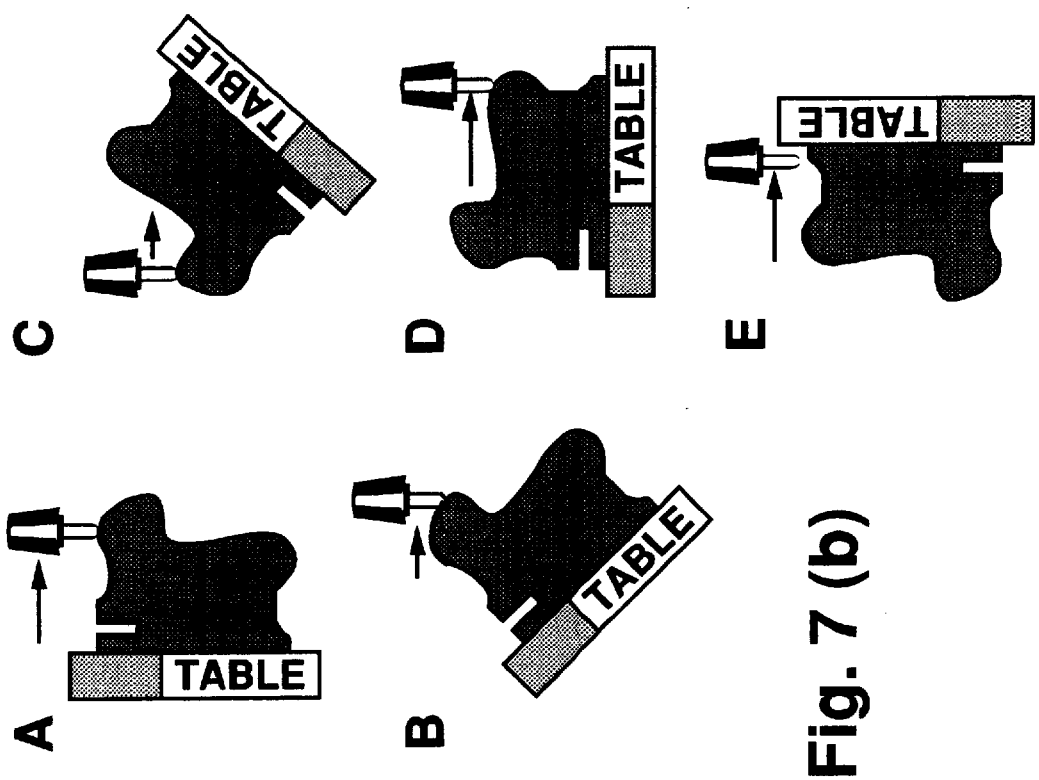
FIG. 7 is an explanatory figure showing relationship between a tool and a workpiece surface to be ma in the present invention.
Figure 7:
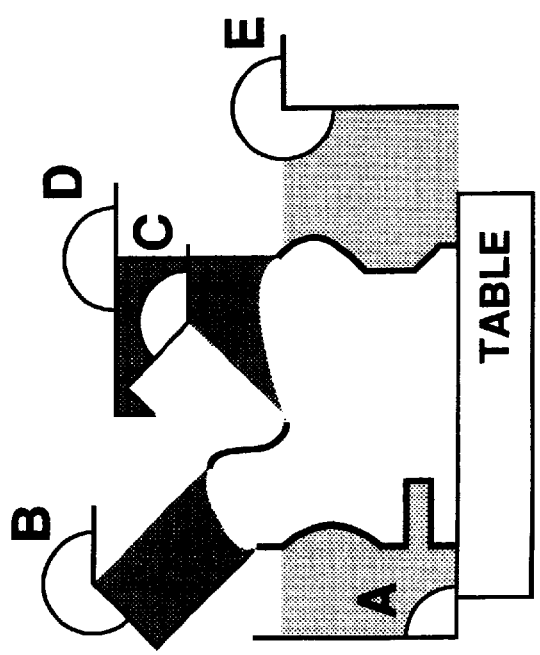

In this case, actions of workpiece surface inclination calculating part 2, workpiece surface inclination classifying part 3, and orientation angle deciding part 4 are the same as described for the block diagram shown in FIG. 1. As a result, an NC program can be generated in which the relationship between the tool and the workpiece surface to be machined is as illustrated by FIGS. 6 and 7.

As described above, the embodiment, in which an NC program is input as machining information and an NC program is output as a numerical control command including orientation commands, was explained using a block diagram shown in FIG. 8. The embodiment explained by this block diagram may be built into an automatic programming device or a numerical control device in the same way as shown in FIG. 1.

Thirdly, the embodiment in which a decoded NC program data decoded from the NC program inside a numerical control device is input as machining information, and similarly an decoded NC program data is output as numerical control commands, will now be described using the block diagram shown in FIG. 10. The means common to FIGS. 1 and 8 are designated with the same number.

In an ordinary numerical control device, NC program interpreting part 8 reads and decodes an NC program, and interpolation control part 9 converts the NC program into a form which makes interpolation processes easy to perform. Interpolation control part 9 periodically executes interpolating calculation for a constant period on the basis of the interpolation commands on the decoded NC program, and outputs the results to servo control part 10 as position commands. Servo control part 10 executes position control, velocity control, and torque control on the basis of the position commands, and drives a motor by outputting a control signal for driving the motor to a servo amplifier.

In the present embodiment, machining shape generating part 11 receives interpolation commands for X, Y, Z axes on the NC program from NC program interpreting part 8 in a decoded form, and generates hypothetical machining data in a way similar to machining shape generating part 7 shown in the block diagram of FIG. 8.

Numerical control command generating part 12 generates a decoded NC program data including orientation commands and interpolation commands for X, Y, Z axes in a way similar to numerical control command generating part 6 shown in the block diagram of FIG. 8, and outputs the decoded NC program data to interpolation control part 9.

In this case, actions of workpiece surface dividing part 1, workpiece surface inclination calculating part 2, workpiece surface inclination classifying part 3, and orientation angle deciding part 4 are the same as described in the block diagrams shown in FIGS. 1 and 8.

As a result, interpolation control part 9 and servo control part 10 operate on the basis of decoded NC program data generated in numerical control command generating part 12, and relative behavior between the tool and the workpiece surface to be machined becomes as shown in FIGS. 6 and 7.

Figure 10:
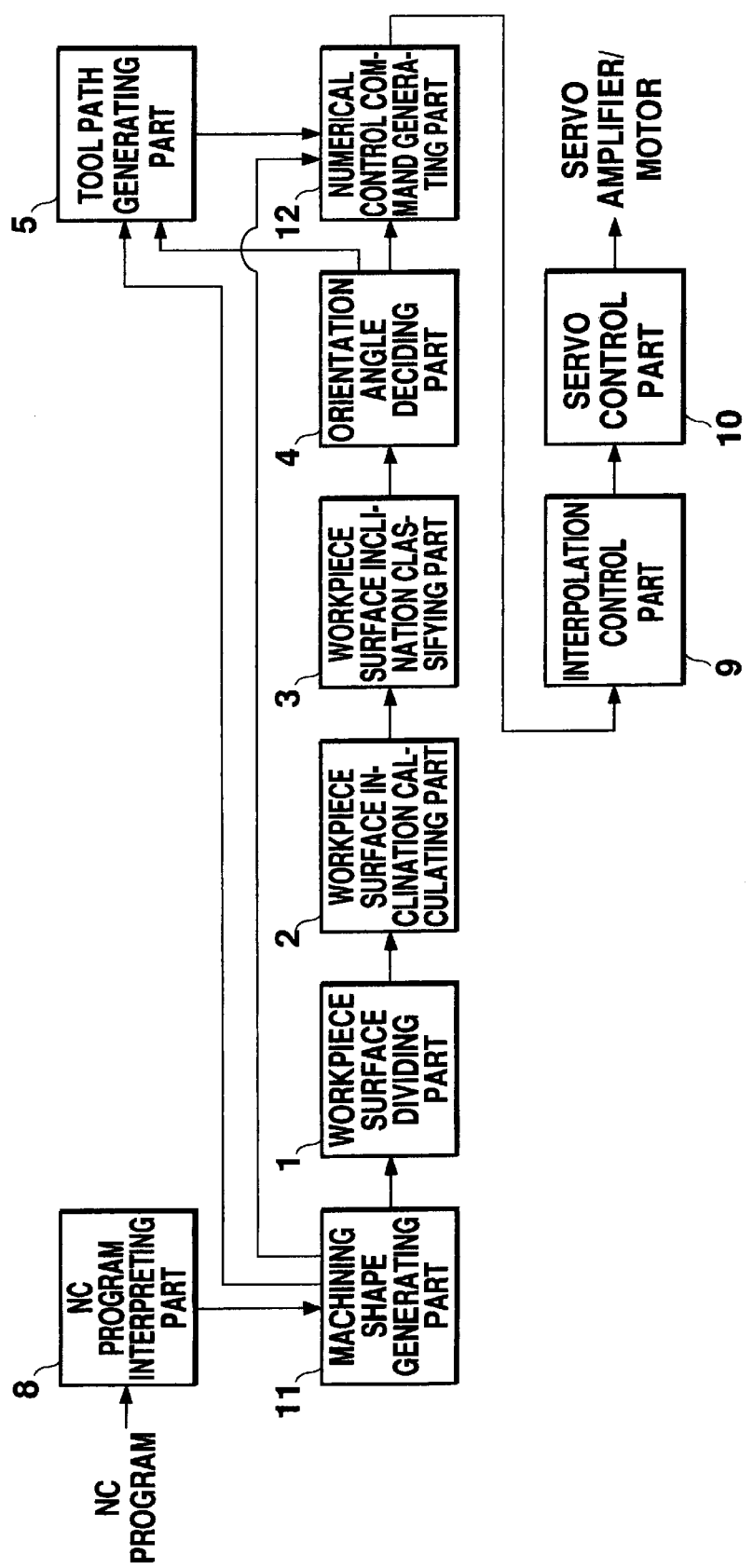
FIG. 10 is a block diagram showing a third embodiment of the present invention.

As described above, the embodiment in which a decoded NC program data is input as machining information and a decoded NC program data is output as an NC command including orientation commands was explained using a block diagram shown in FIG. 10.

As described above, according to the present invention, NC commands including orientation commands for angular motion axes so as to carry out heavy cutting and five-axis machining under highly rigid conditions without deteriorating machining accuracy can be generated.

In addition, according to the present invention, NC commands including orientation commands can be generated without executing complicated calculations for a tremendously large number of repetitions.

In addition, as mentioned in the description of the embodiments, the present invention can be applied to an automatic programming device and also to a numerical control device. When the present invention is applied to an automatic programming device, an NC program including optimum orientation commands can be prepared. As a result, the above-mentioned effects can be achieved even if the present invention is applied to a conventional numerical control device as it is. When the present invention is applied to a numerical control device, NC commands including optimum orientation commands for achieving the above-mentioned effects are generated in the numerical control device. As a result, a conventional automatic programming device can be used as it is.

In addition, it is obvious that according to the present invention, the same effects can be achieved even in a four-axis machine tool having only one linerotational axis.

What is claimed is:

1. A numerical control command generator for generating numerical control commands including orientation commands on the basis of machining information, comprising:

grouping means for grouping workpiece surface to be machined according to the inclination of the workpiece surface to at least one predetermined plane into inclination groups on the basis of machining information;

angle deciding means for deciding, for each inclination group, an orientation angle relative to the at least one predetermined plane for that inclination group; and command generating means for generating numerical control commands including orientation commands for orienting, for each workpiece surface of an inclination group, at least one machining tool or a workpiece based on the decided orientation angle for that inclination group.

2. A numerical control command generator according to claim 1, wherein the machining information comprises:

a shape to be machined; or an NC program; or a decoded NC program data decoded from the NC program inside the numerical control device.

3. A numerical control command generator according to claim 1, wherein the numerical control commands comprises:

an NC program; or a decoded NC program data decoded from the NC program inside the numerical control device.

4. A numerical control command generator according to claim 1, wherein the grouping means comprises:

dividing means for dividing a workpiece surface into at least one predetermined plane;

inclination-calculating means for calculating an inclination of each predetermined plane of the divided workpiece surfaces; and classifying means for classifying the divided workpiece surface predetermined plane on the basis of similarity of inclination.

5. A numerical control command generating method for generating numerical control commands including orientation commands on the basis of machining information comprising the steps of:

a grouping step for grouping workpiece surfaces to be machined according to the inclination of the workpiece surfaces to at least one predetermined plane into inclination groups on the basis of machining information;

an angle deciding step for deciding, for each inclination group, an orientation angle relative to the at least one predetermined plane for that inclination group; and a command generating step for generating numerical control commands including orientation commands, for orienting, for each workpiece surface of an inclination group, at least one machining tool or a workpiece based on the decided orientation angle for that inclination group.

6. A numerical control command generating method according to claim 5, wherein the grouping step comprises the steps of:

a dividing step for dividing a workpiece surface into at least one predetermined plane;

an inclination-calculating step for calculating an inclination of each predetermined plane of the divided workpiece surfaces; and a classifying step for classifying the divided workpiece surface predetermined plane on the basis of similarity of inclination.

7. Media recording a program for causing a computer to execute:

a grouping procedure for grouping workpiece surfaces to be machined according to the inclination of the workpiece surfaces to at least one predetermined plane into inclination groups on the basis of machining information;

an angle deciding procedure for deciding for each inclination group, an orientation angle relative to the at least one predetermined plane for that inclination group; and a command-generating procedure for generating NC commands including orientation commands for orienting, for each workpiece surface of an inclination group, at least one machining tool or a workpiece based on the decided orientation angle for that inclination group.

8. Media according to claim 7, wherein the program for executing the grouping procedure comprises:

a program for executing a dividing procedure for dividing in a workpiece surface into at least one predetermined plane;

a program for executing an inclination-calculating procedure for calculating an inclination of each predetermined plane of the divided workpiece surfaces; and a classifying procedure for classifying the divided workpiece surface predetermined plane on the basis of similarity of inclination.

* * * * *

UNITED STATES PATENT AND TRADEMARK OFFICE
CERTIFICATE OF CORRECTION

PATENT NO. : 6,223,095 B1
DATED : April 24, 2001
INVENTOR(S) : Kazuo Yamazaki et al.

It is certified that error appears in the above-identified patent and that said Letters Patent is hereby corrected as shown below:

Please change the PCT filing date of "January 7, 1996" to -- November 7, 1996 --.

Signed and Sealed this

Fourth Day of December, 2001

Attest:

*Nicholas P. Godici*

NICHOLAS P. GODICI
*Attesting Officer*  *Acting Director of the United States Patent and Trademark Office*